(12) United States Patent
Wang

(10) Patent No.: US 10,023,263 B2
(45) Date of Patent: Jul. 17, 2018

(54) PEDAL OF BICYCLE

(71) Applicant: John Wang, Taichung (TW)

(72) Inventor: John Wang, Taichung (TW)

(*) Notice: Subject to any disclaimer, the term of this patent is extended or adjusted under 35 U.S.C. 154(b) by 0 days.

(21) Appl. No.: 15/371,477

(22) Filed: Dec. 7, 2016

(65) Prior Publication Data
US 2018/0154978 A1    Jun. 7, 2018

(51) Int. Cl.
*B62M 3/08*    (2006.01)

(52) U.S. Cl.
CPC ..................... *B62M 3/08* (2013.01)

(58) Field of Classification Search
CPC ........................................................ B62M 3/08
See application file for complete search history.

(56) References Cited

U.S. PATENT DOCUMENTS

| | | | | |
|---|---|---|---|---|
| 533,180 A * | 1/1895 | Perkins | ............ | B62M 3/08 74/594.4 |
| 1,519,327 A * | 12/1924 | Peace | ............ | B62M 3/08 74/594.4 |
| 2,605,649 A * | 8/1952 | Countryman | ............ | B62M 3/08 74/594.4 |

* cited by examiner

*Primary Examiner* — Thomas C Diaz
(74) *Attorney, Agent, or Firm* — Muncy, Geissler, Olds & Lowe, P.C.

(57) ABSTRACT

The pedal of bicycle includes a frame and a cushion pad. The frame includes a frame portion enclosing at least one hollow portion. The frame portion has a first face and a second face. The hollow portion penetrates the first face and the second face. A portion of the first face most remote from the second face defines a first imaginary plane, and a portion of the second face most remote from the first face defines a second imaginary plane. The cushion pad is made of elastic material and is embedded in the hollow portion. The cushion pad has a third face and a fourth face. The third face corresponds to the first face, and the fourth face corresponds to the second face. The third face is protruded above the first imaginary plane, and the fourth face is protruded above the second imaginary plane normally.

9 Claims, 4 Drawing Sheets

PEDAL OF BICYCLE

BACKGROUND OF THE INVENTION

Field of the Invention

The present invention relates to a pedal of bicycle.

Description of the Prior Art

A conventional pedal of bicycle is usually made of metal or hard plastics, and it has a hollow portion on the stepping face. The pedal usually has rough surface or ribs to engage with the bottom of shoes for anti-slipping.

However, the stepping face is very hard. Especially when riding on rough grounds, the rider may become tired easily. Also, when riding in the rain, the hard surface raises the risk of slipping. Besides, the hard surface can not provide any feedback force to the bottom of the shoes, so it is more difficult to lift the pedal up. On the contrary, if the pedal is made of elastic material wholly, the force of stepping may be absorbed too much so that the speed of riding is hardly increased.

To improve the conventional pedals, a new pedal is invented. The pedal is made of metal and is formed with a groove around the periphery. A plastic cushion pad is arranged around the pedal to be partially embedded in the groove by injection molding, so the cushion pad becomes the stepping face. Thus, it is more comfortable when stepping on the cushion pad. However, the shoes may not contact the metal pedal, so the shoes can not engage with the pedal for positioning. Even if the cushion pad is formed with rough surface, the performance of anti-slipping is still not good enough. In addition, the cushion pad may deform after using. Besides, the cushion pad is sleeved onto the pedal instead of fixedly connected to the pedal, so the cushion pad is possible separated from the pedal when being stepped inclinedly.

SUMMARY OF THE INVENTION

The main object of the present invention is to provide a pedal of bicycle which is comfortable when riding, is able to engage with the shoes, and is laborsaving.

To achieve the above and other objects, a pedal of bicycle of the present invention includes a frame and a cushion pad.

The frame is annular and includes a frame portion. The frame portion encloses at least one hollow portion. The frame portion has a first face and a second face. The hollow portion penetrates the first face and the second face. A portion of the first face of the frame portion most remote from the second face defines a first imaginary plane, and a portion of the second face of the frame portion most remote from the first face defines a second imaginary plane. The frame further includes a connecting portion. The connecting portion is adapted for connecting to a bicycle.

The cushion pad is soft and is made of elastic material. The cushion pad is embedded in the hollow portion. The cushion pad has a third pad a fourth pad. The third face corresponds to the first face of the frame portion, and the fourth face corresponds to the second face of the frame portion. Normally, the third face is protruded above the first imaginary plane, and the fourth face is protruded above the second imaginary plane.

Thereby, the pedal of bicycle of the present invention improves the comfort when riding. When the cushion pad is stepped on, the shoes can engage with the frame portion to prevent from slipping.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
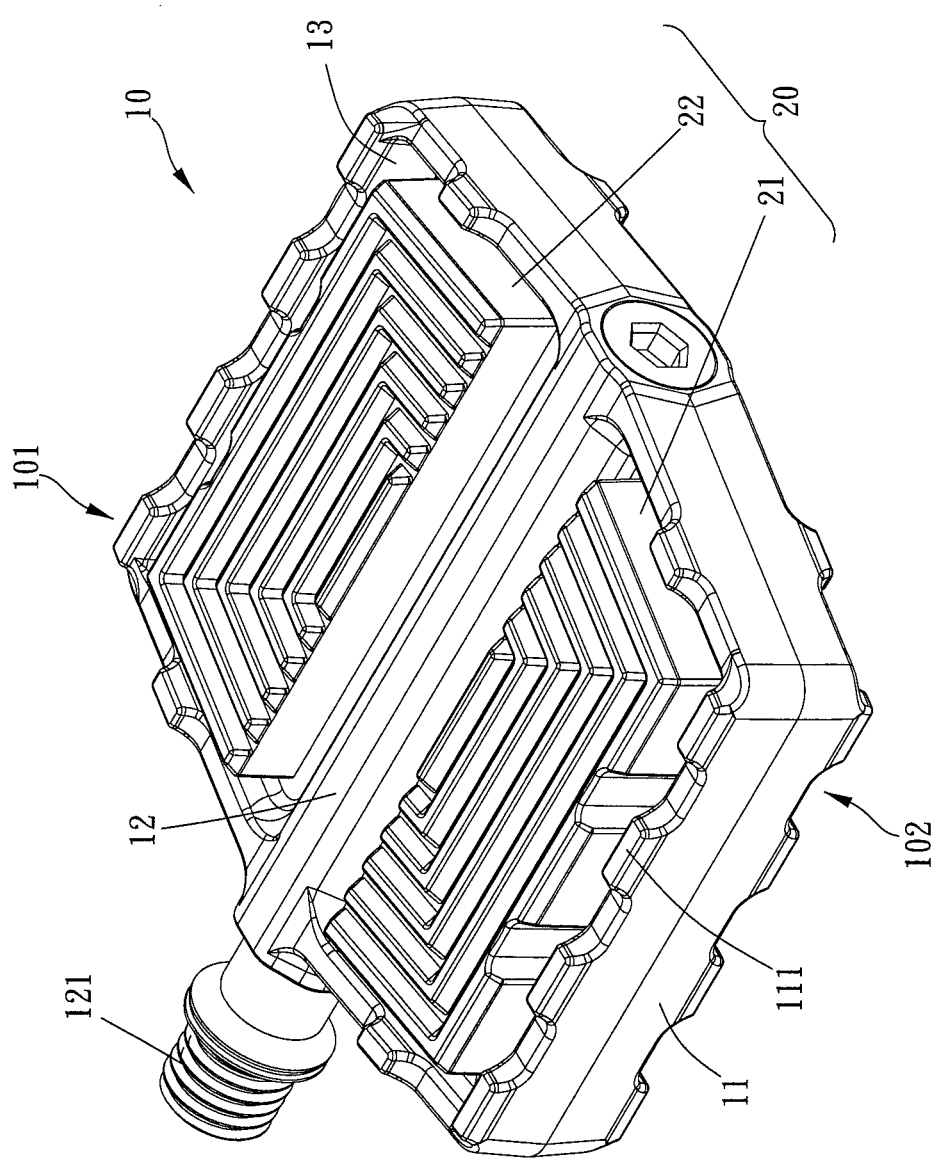
FIG. 1 is a stereogram of the present invention.
Figure 2:
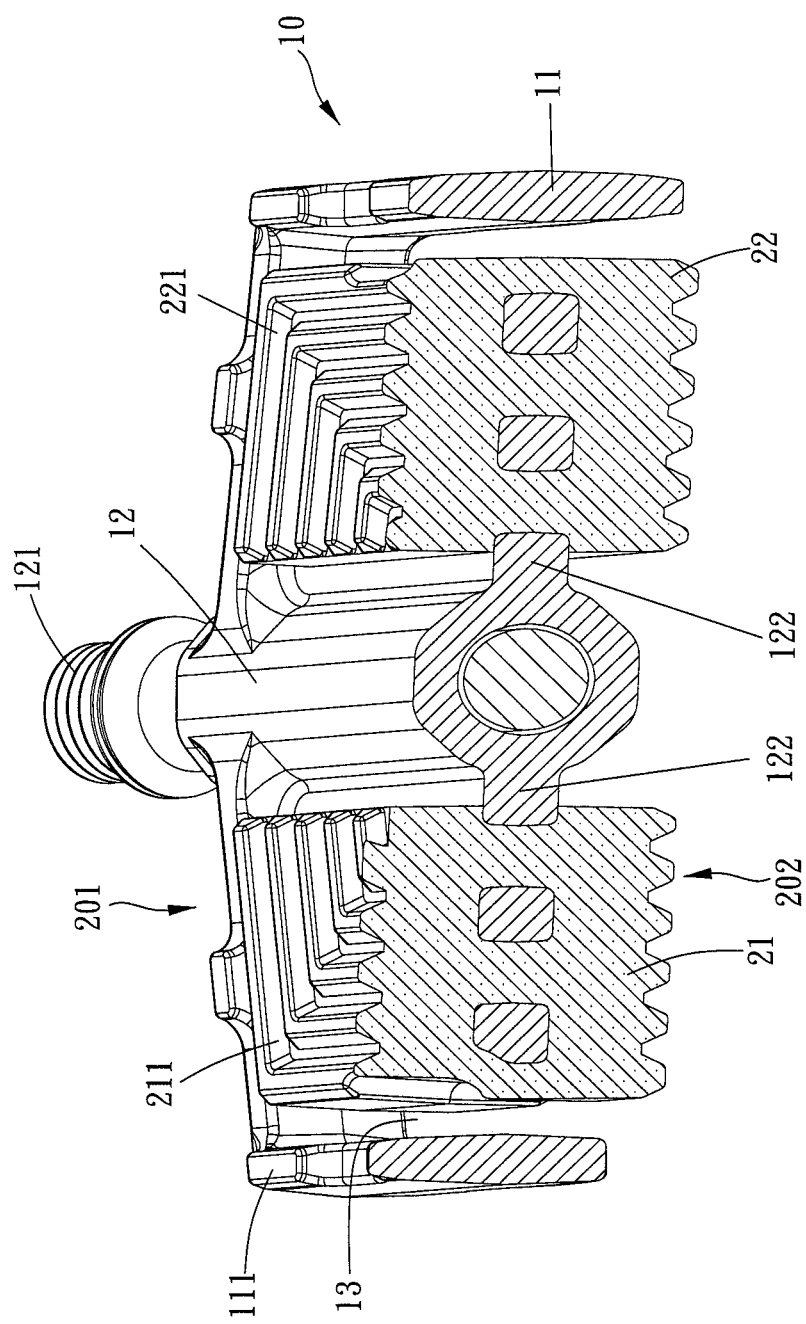
FIG. 2 is a cross-section of the present invention.

Please refer to FIG. 1 to FIG. 4, the pedal of bicycle of the present invention includes a frame 10 and a cushion pad 20.

The frame 10 is preferably made of metal, such as aluminum alloy or aluminum-magnesium alloy. The frame 10 includes a frame portion 11. The frame portion 11 encloses at least one hollow portion. The frame portion 11 has a first face 101 and an opposite second face 102. The hollow portion penetrates the first face 101 and the second face 102. A portion of the first face 101 most remote from the second face 102 defines a first imaginary plane, and a portion of the second face 102 most remote from the first face 101 defines a second imaginary plane. The frame 10 further includes a connecting portion 121 adapted for connecting to a bicycle. Preferably, the frame portion 11 has a plurality of toothed portions 111 formed spacedly on each of the first face 101 and the second face 102. The first imaginary plane and the second imaginary plane are defined by the top faces of the toothed portions 111.

The cushion pad 20 is made of soft and elastic material and is embedded in the hollow portion. Preferably, the cushion pad 20 is made of PU (Polyurethane). The hardness of the material can be alternated according to the weight of rider or the rider's posture, such as sitting or standing. The cushion pad 20 has a third face 201 and an opposite fourth face 202. The third face 201 corresponds to the first face 101 of the frame portion 11, and the fourth face 202 corresponds to the second face 102 of the frame portion 11. Normally, the third face 201 is protruded above the first imaginary plane, and the fourth face 202 is protruded above the second imaginary plane.

More specifically, the frame 10 further includes a central axle 12. Preferably, the central axle 12 can be made of chrome-molybdenum steel to provide better strength. The central axle 12 is parallel to the first face 101 and the second face 102 and penetrates the frame portion 11. The central axle 12 further extends outward to form the connecting portion 121. The central axle 12 partitions the area enclosed by the frame portion 11 into two hollow portions. The cushion pad 20 includes a first pad 21 and a second pad 22. The first pad 21 and the second pad 22 are embedded in the two hollow portions and are fixed to the central axle 12 respectively. Preferably, a support rack 122 extends from the central axle 12 into each hollow portion. The free end of each support rack 122 is inserted into the first pad 21 or the second pad 22 to support it. A gap is formed between an inner periphery of the frame portion 11 and an outer periphery of each of the first pad 21 and the second pad 22 to allow the deformation of the cushion pad 20. Besides, the first pad 21 and the second pad 22 are formed with a plurality of ribs 211,221 on the third face 201 and the fourth face 202 respectively. The ribs 211,221 are arranged spacedly. Each rib 211,221 is substantially parallel to the frame portion 11.

Preferably, the frame portion 11 is substantially square hexagon and can be partitioned into two trapezoid-shaped areas. Each rib 211,221 and the central axle 12 are substantially trapezoid to be parallel to the edges of the frame portion 11. Thereby, the ribs 211,221 can prevent slipping.

About the process to manufacture the pedal of bicycle, in the present embodiment, the metal frame is formed in advance. And then place the frame in a mold, and inject the plastic material or rubber material into the mold to form the cushion pad so that the cushion pad and the frame are formed in a single piece.

Figure 3:
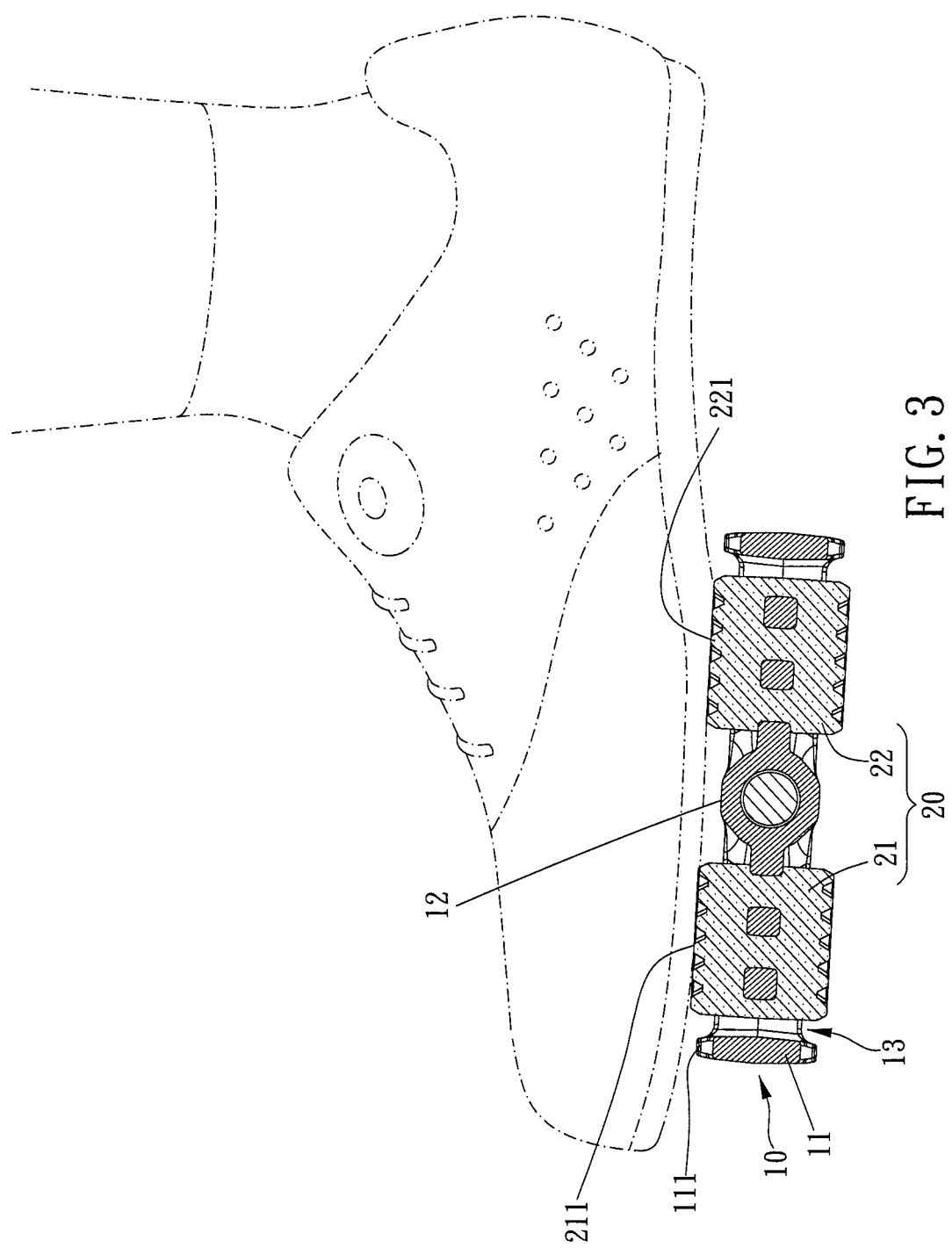
FIG. 3 and FIG. 4 are illustration of the present invention.
Figure 4:
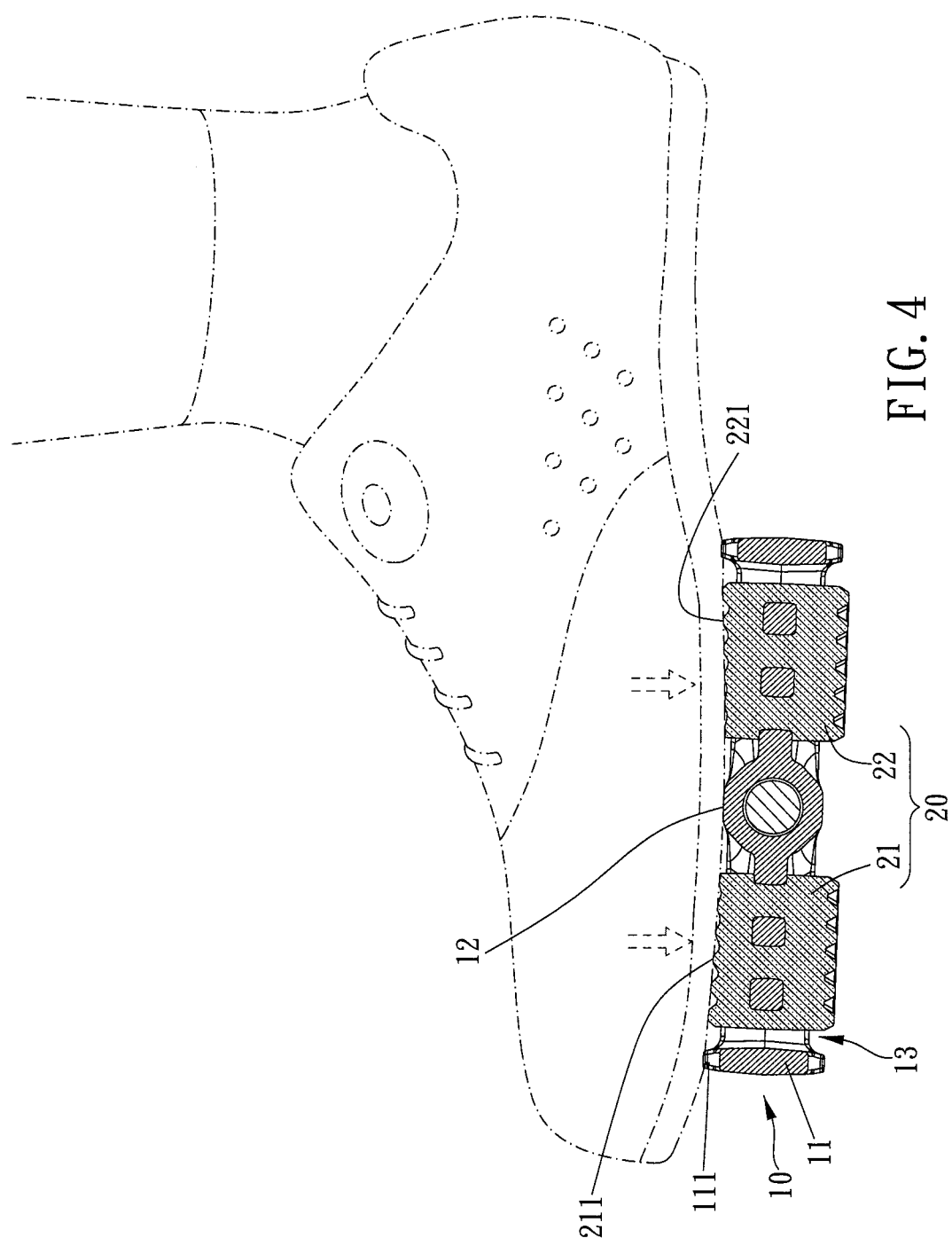

In use, as shown in FIG. 3, when the rider wants to lift the pedal or when the rider is sitting, the shoes of the rider step on the cushion pad 20, so the rider may feel comfortable. Please refer to FIG. 4, when the rider rides on uphill or is standing to ride, the pedal is exerted with much force. Thus, the cushion pad 20 may be slightly defaulted so that the third face 201 is below the first imaginary plane. That is, the shoes may step on the frame portion 11 to be engaged with it, so the force can be transmit to the bicycle efficiently so as to raise the speed. However, most area of the shoes still contacts the cushion pad 20, so the rider still feels comfortable. Besides, when the force exerted on the pedal decreases, such as lifting the pedal, a feedback force is provided by the cushion pad 20 to the shoes to be laborsaving.

Besides, the cushion pad 20 and the frame 10 are formed in a single piece, so the cushion pad and the frame may not separate when riding. In addition, the gap between the cushion pad and the frame portion allows the cushion pad independent from the frame, so the cushion pad may not be damaged.

What is claimed is:

1. A pedal of bicycle, including:
    a frame, including a frame portion, the frame portion enclosing at least one hollow portion, the frame portion having a first face and an opposite second face, the hollow portion penetrating the first face and the second face, a portion of the first face of the frame portion most remote from the second face defining a first imaginary plane, a portion of the second face of the frame portion most remote from the first face defining a second imaginary plane, the frame further including a connecting portion, the connecting portion being adapted for connecting to a bicycle;
    a cushion pad, made of elastic material, embedded in the hollow portion, the cushion pad having a third face and an opposite fourth face, the third face corresponding to the first face of the frame portion, the fourth face corresponding to the second face of the frame portion, the third face being protruded above the first imaginary plane normally, the fourth face being protruded above the second imaginary plane normally;
    wherein a gap is formed between an entire inner periphery of the frame portion and an entire outer periphery of the cushion pad.

2. The pedal of bicycle of claim 1, wherein the cushion pad is made of PU.

3. The pedal of bicycle of claim 1, wherein frame is made of metal.

4. The pedal of bicycle of claim 1, wherein the frame further includes a central axle, the central axle is parallel to the first face and the second face and penetrates the frame portion, the central axle further extends outward to form the connecting portion, the central axle partitions an area enclosed by the frame portion into two hollow portions, the cushion pad includes a first pad and a second pad, the first pad and the second pad are embedded in the two hollow portions respectively and are fixed to the central axle respectively.

5. The pedal of bicycle of claim 4, wherein said gap is formed between the entire inner periphery of the frame portion and entire outer periphery of each of the first pad and the second pad.

6. The pedal of bicycle of claim 4, wherein the first pad is formed with a plurality of ribs spacedly arranged on the third face, the second pad is formed with a plurality of ribs spacedly arranged on the fourth face.

7. The pedal of bicycle of claim 6, wherein the frame portion is substantially hexagon, each rib and the central axle are substantially trapezoid to be parallel to edges of the frame portion.

8. The pedal of bicycle of claim 4, wherein the at least one support rack extends from the central axle to each hollow portion, the support racks are inserted into the first pad and the second pad to support the first pad and the second pad.

9. The pedal of bicycle of claim 1, wherein each of the first face and the second face of the frame portion is formed with a plurality of toothed portions, the first imaginary plane and the second imaginary plane are defined by top faces of the toothed portions.

\* \* \* \* \*